United States Patent
Ng et al.

(10) Patent No.: US 9,681,106 B2
(45) Date of Patent: Jun. 13, 2017

(54) VIEWER-PERSONALIZED BROADCAST AND DATA CHANNEL CONTENT DELIVERY SYSTEM AND METHOD

(75) Inventors: Sheau Ng, Wayland, MA (US); Nagarajan Gopalakrishnan, Bangalore (IN)

(73) Assignee: NBCUniversal Media, LLC, Wilmington, DE (US)

( * ) Notice: Subject to any disclaimer, the term of this patent is extended or adjusted under 35 U.S.C. 154(b) by 1021 days.

(21) Appl. No.: 12/635,229

(22) Filed: Dec. 10, 2009

(65) Prior Publication Data
US 2011/0145849 A1 Jun. 16, 2011

(51) Int. Cl.
| | | |
|---|---|---|
| H04H 60/32 | (2008.01) | |
| H04N 7/173 | (2011.01) | |
| H04H 60/46 | (2008.01) | |
| H04N 21/258 | (2011.01) | |
| H04N 21/466 | (2011.01) | |
| H04N 21/658 | (2011.01) | |
| H04N 21/81 | (2011.01) | |

(52) U.S. Cl.
CPC ........ *H04N 7/17318* (2013.01); *H04H 60/46* (2013.01); *H04N 21/25891* (2013.01); *H04N 21/4667* (2013.01); *H04N 21/6582* (2013.01); *H04N 21/812* (2013.01)

(58) Field of Classification Search
CPC ......... H04N 21/4667; H04N 21/25891; H04N 21/812
USPC ............................ 725/14, 93, 32, 34, 38, 74
See application file for complete search history.

(56) References Cited

U.S. PATENT DOCUMENTS

| | | |
|---|---|---|
| 7,103,903 B1 | 9/2006 | Kydd |
| 2002/0056086 A1 | 5/2002 | Yuen |
| 2002/0194589 A1* | 12/2002 | Cristofalo et al. .............. 725/32 |
| 2005/0005292 A1 | 1/2005 | Kimata |
| 2005/0076358 A1 | 4/2005 | Yamada |
| 2007/0271580 A1 | 11/2007 | Tischer |
| 2008/0320520 A1 | 12/2008 | Beadle |
| 2010/0131969 A1* | 5/2010 | Tidwell et al. ................. 725/14 |
| 2013/0014159 A1* | 1/2013 | Wiser et al. .................... 725/34 |

FOREIGN PATENT DOCUMENTS

| | | |
|---|---|---|
| EP | 1207695 A1 | 5/2002 |
| JP | 2004134880 A | 4/2004 |
| JP | 2006060284 A | 3/2006 |

(Continued)

OTHER PUBLICATIONS

European Search Report; P26652EP/SSA; 10172214.8-1522, Jun. 4, 2011.

*Primary Examiner* — Jivka Rabovianski
(74) *Attorney, Agent, or Firm* — Fletcher Yoder, P.C.

(57) ABSTRACT

Data is transmitted by or collected from individual receivers of broadcast content on a particularized basis. The broadcast content is transmitted without regard to selection of a particular content stream by any one or more receivers. The receiver data is analyzed, and may be analyzed in conjunction with other information such as details on broadcast content streams made during certain times, and selections of broadcast streams by particular receivers. System configuration changes and targeted content may then be transmitted by a bidirectional data exchange medium to the individualized receivers based upon the analysis.

2 Claims, 4 Drawing Sheets

(56) References Cited

FOREIGN PATENT DOCUMENTS

| | | | |
|---|---|---|---|
| JP | 2006344107 | A | 12/2006 |
| JP | 2008067130 | A | 3/2008 |
| JP | 2009088627 | A | 4/2009 |
| WO | 2008038941 | A1 | 4/2008 |

* cited by examiner

VIEWER-PERSONALIZED BROADCAST AND DATA CHANNEL CONTENT DELIVERY SYSTEM AND METHOD

BACKGROUND OF THE INVENTION

The subject matter disclosed herein relates to broadcasting and reception of media content and the transmission of user or receiver-tailored instructions or content based upon analysis of selected broadcast content preferences.

The distribution of multimedia content has undergone very substantial change in the past decades. Traditional broadcasting involved emission of signals over bands of the electromagnetic spectrum, with receivers (e.g., radios and televisions) collecting the emitted signals and decoding them for replay of the broadcast content. While this continues to be a very important paradigm, it is increasingly supplanted by satellite and cable services. While traditional "airwave" broadcasts are clearly "one-way", allowing for no feedback on program selections and preferences, satellite and cable services afford some limited degree of user communication, such as for selection of so-called "pay-per-view" content.

Even these models are increasingly challenged by developments of Internet-based approaches that are highly individualized by their very nature. That is, an ever-growing amount of the content traditionally available over broadcast, satellite and cable media can now be had by visiting a website via a conventional browser application, and downloading the content, or more readily, playing it in real time or near real time. Services offered over cellular networks (e.g., on handheld telephones, "smartphones", personal digital assistance, and so forth) operate in much the same way from the point of view of information exchange and user experience.

While such developments have dramatically changed the broadcast landscape, considerable gaps remain in and between these content delivery solutions. For example, extremely limited or no link is available between programming selections actually made by viewers (or listeners) of broadcast content and the content providers. For many years dedicated services, such as those performed by Neilsen Media Research and others, have allowed for monitoring of viewer selections and habits. However, this information has been used for very long-term planning (e.g., of broadcast season-scale investment in current and future program production). The information is not collected or processed in a manner to permit more immediate (e.g., during a broadcast) changes. Moreover, such information is not used to customize the entertainment experience of the individual audience participant.

Conversely, Internet-based delivery techniques provide extremely user-customized content, such as advertisements, product offerings, and the like, often based on accessing and storing of user information either on the user system or elsewhere. Identifiers, such as "cookies" are commonly downloaded and referenced to determine user or system preferences, histories, and so forth. However, such analysis is based on visits by users to specific sites, which themselves transmit packetized information requested by the user on demand. Cellular technologies currently behave in much the same way. "Broadcast" content is not of this nature; it is transmitted to any and all potential audiences without regard to the selections made by individual users or viewers.

There is a need for improved techniques that can bridge a gap between broadcast (i.e., unidirectional) dissemination of multimedia content and the provision of user or receiver-customized content or control via a bidirectional media.

BRIEF DESCRIPTION OF THE INVENTION

The present invention provides methods and systems for addressing such needs. The novel approaches offered by the invention allow for the dissemination of content via broadcast to a wide range of receivers that may or may not select the content. Information from the receivers is received for analysis. The information may be used to customize content offerings to individual receiver or to one or more users of the receivers. The information may also be used to adapt operation and control of the receiver based upon analyzed preferences, product offerings, current past content selections, and so forth.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
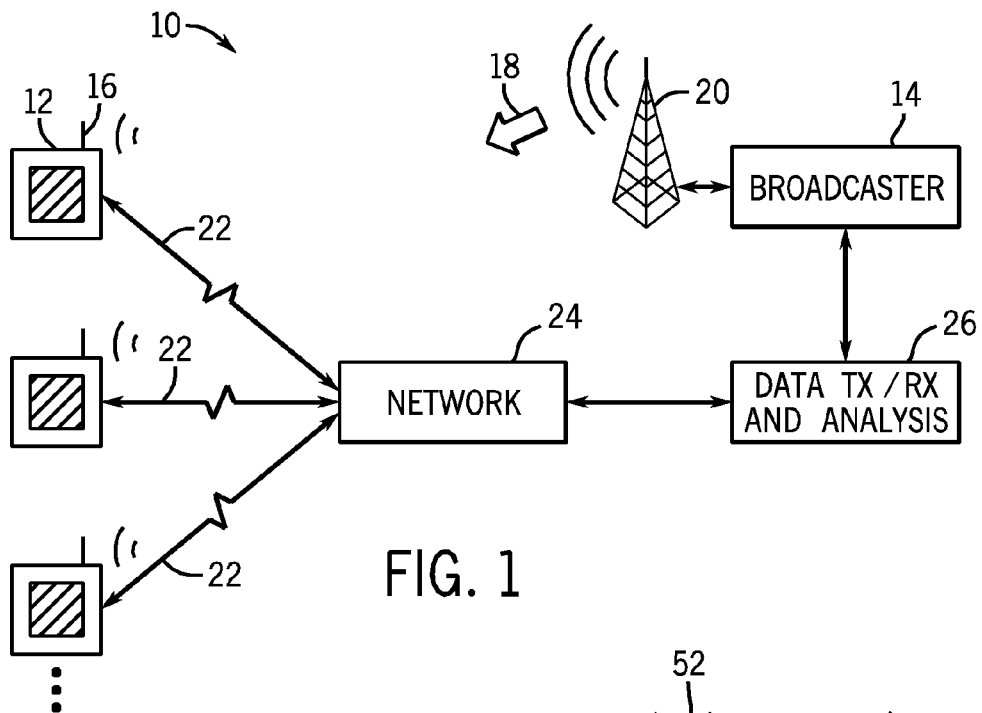
FIG. 1 is a diagrammatical overview of an exemplary content delivery system in accordance with certain aspects of the invention.

Turning to the drawings, FIG. 1 illustrates an exemplary content delivery system, designated generally by the reference numeral 10. In one presently contemplated embodiment, system 10 is designed to deliver multimedia content, such as television programming. Such content may include any conventional data streams, such as series programming, sports programming, movies, music, and so forth. The content is received and played on receivers 12, which may include conventional television sets, but that will be equipped for bidirectional data exchange with the broadcaster or an entity associated with the broadcaster. It should also be noted that such receivers, as described below, may comprise computers and various devices with processing capabilities such that they can receive and process signals into video, audio, multimedia and similar output. For example, the receivers may employ techniques such as so-called software defined radio ("SDR"), as well as other signal processing technologies. Such devices are currently available under various names, and are sometimes referred to as "Internet-ready televisions." However, as noted below, the receivers themselves may include integrated circuitry for this purpose, or may be capable of reception or even of playback only, and placed in communication with other devices that are themselves equipped for data communication. Such devices may be of the type sometimes referred to as "set-top boxes", although any suitable device may be used for this purpose, including application specific and general purpose computers.

The receivers 12 receive the broadcast content from a broadcaster 14. In one presently contemplated embodiment, the broadcaster 14 is a conventional television broadcast entity emitting program content in a continuous stream. The broadcaster may, in some instances, emit multiple streams of content simultaneously. In practice, many arrangements and business models may be involved in defining the "broadcaster", and in the case of television networks, these may include an entity that creates or provides certain content and entities dispersed geographically ("local stations") that receive the content and perform the actual broadcast over a portion of the electromagnetic spectrum attributed to the broadcaster. In practice, the broadcaster 14 may be only one of many broadcasters that simultaneously and in parallel emit content that may be selected by individual viewers via their respective receivers 12. In conventional parlance, the viewers may "dial a channel" on the receiver to select the content from the broadcaster. "Broadcasters" in the present context may also include so-called "multiservice operators" ("MSO's") that output many broadcast content streams in parallel to potential audiences.

In the embodiment illustrated in FIG. 1, each receiver 12 includes some type of reception channel 16 designed to receive unidirectional content 18 from the broadcaster, typically emitted by an antenna 20. This use of the term "channel" should not be confused with the program selection made by the viewer on the receiver tuning device (e.g., set control, remote control, etc.). The broadcast "channel" is, instead, a data transmission channel that serves to carry and deliver a signal stream from the broadcaster to the individual receivers. This data transmission channel is unidirectional, meaning that the receivers can receive, decode and playback content from the broadcaster, but the broadcaster cannot receive data from the individual receivers, or exchange data with the receivers via this broadcast channel.

However, the receivers are equipped with a second channel for bidirectional data exchange. This channel is represented generally by reference numeral 22 in FIG. 1. As discussed in greater detail below, this channel may be configured on various ways, such as for communication over telephone lines, cable lines, wireless transmission networks, and so forth. In presently contemplated embodiments, this channel will include an Internet connection such that the receivers 12, or a device integrated with or connected to each receiver can receive and transmit data via the Internet. For example, the receiver may be attributed an IP address, and exchange data with sites of the Worldwide Web via an Internet service provider (not represented separately in the figures). In general, then, the bidirectional data exchange channels 22 will connect to a network 24 for two-way communication of data.

A data analysis system, represented generally by reference numeral 26 is also connected to the network 24 to receive data from (and where desired to provide data to) the receivers 12 via the bidirectional data exchange channels 22 in parallel with the broadcast channels 16. As discussed in detail below, various data may be sent by, or solicited from the receivers that is analyzed by system 26. In presently contemplated embodiments, this data may include which program is currently selected (i.e., being viewed) by the receivers, the state of the receivers (i.e., on or off), historical program selections, program selection listing preferences (e.g., setup of program guide menus as altered or customized by the viewer), settings for current or future recording of program selections, special orders of present and/or future program offerings, and so forth. Moreover, the data may include or exclude personal information about the viewer. In presently contemplated embodiments the viewer may be provided with an opportunity to "opt out" or otherwise disallow such data gathering, or conversely, the system may default to an "opt out" but allow the viewer to set an "opt in" parameter by which the desired data may be sent to the analysis system 26 or drawn by the system from the receiver. Various opt out and opt in processes may be envisioned, including "one time" opt ins or opt outs (e.g., at the time a receiver installed or a service is initiated, temporary opt ins and opt outs (e.g., in real time when selected by a user of a receiver), or at any time between (e.g., by configuration or reconfiguration of a profile). Moreover, the system may be adapted to permit opt in or opt out for particular data or offering sources, types and so forth. The data may also include demographic information, if available, such as the viewer or household preferences, interests, likes and dislikes, discretionary filtering desires (e.g., against explicit content), and so forth. Also, the data will preferably include or permit determination of a geographic location of the receivers, which may be quite specific, or general (e.g., neighborhood, region, area, metropolitan agglomeration, etc.). It should be noted that some of this information may be accessed from other sources (not separately represented) that store the information and associate it with data that is gathered from the receivers. That is, such information may provide information or insights into context, location, and behavior of a user of a receiver, such as a viewer profile, viewing history, preferences, current and past program orders, geographic locations, signal strength, multipath data, and so forth may be stored in a data repository that can be accessed by the analysis system 26 (or that may be part of the system) to perform the desired analyses based on the data received from the receivers.

As will be described in greater detail below, the system 10 is adapted to receive or access data from receivers of broadcast content, to analyze the received information, and to customize control and/or offerings for particular receivers (or users) based upon the analysis.

Figure 2:
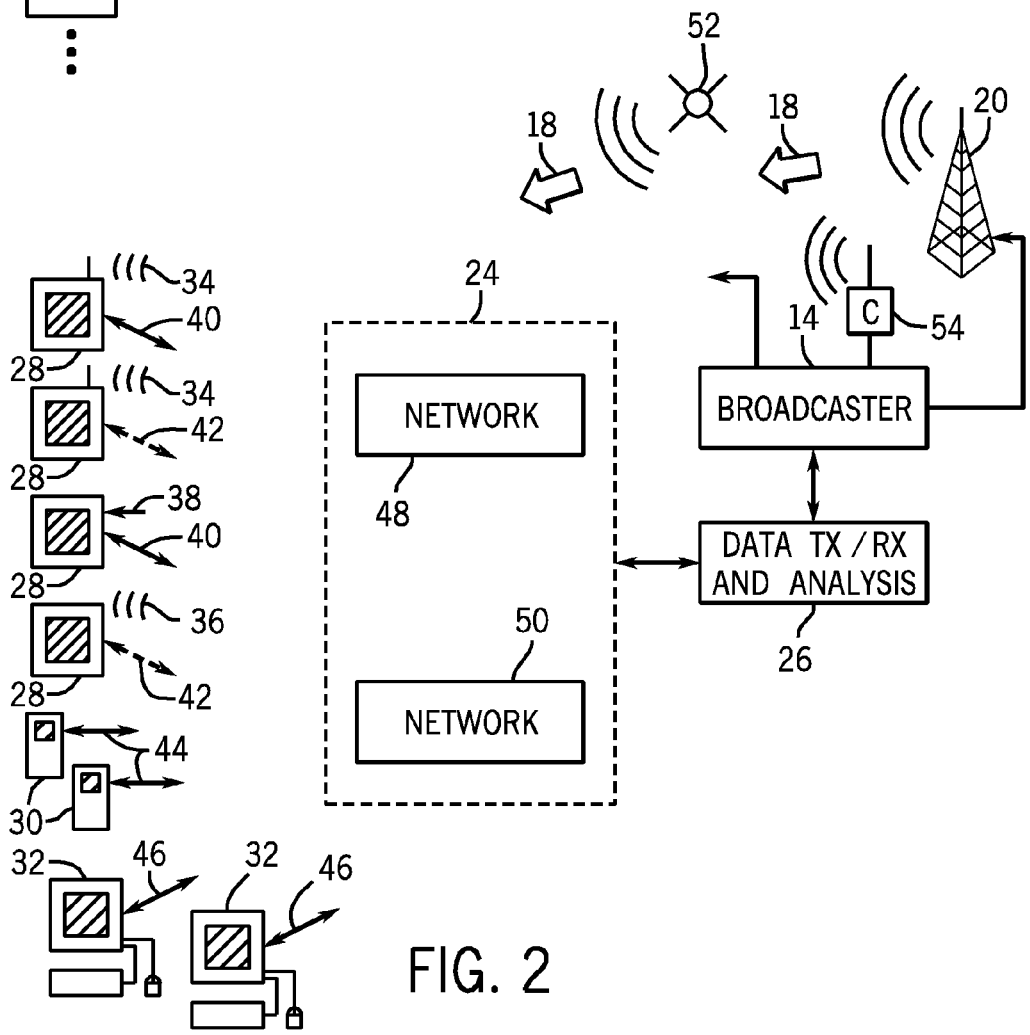
FIG. 2 is a somewhat more detailed representation of a similar content delivery system utilizing various unidirectional delivery technologies and illustrating several possible bidirectional data exchange approaches.

As noted, in a presently contemplated embodiment, the invention provides for adjustment of preferences, control parameters and so forth on particular receivers, and/or for the provision of particularized offerings based upon received and analyzed data in the context of broadcast television. However, other paradigms are also envisioned for the present technique, as illustrated in FIG. 2. By way of example, these may include receivers that are television systems 28, telephones, personal digital assistants, and so forth, 30, and personal computer systems 32. Some or all of these may be stationary (e.g., fixed in a household, hotel, etc.), while others may be mobile, such as in the case of telephones, but also including receivers in automobiles, aircraft, and so forth. Moreover, both the unidirectional broadcast media and the bidirectional data exchange media may vary. In the illustrated embodiment, the broadcast media may include conventional terrestrial broadcast spectra 34 (e.g., reserved for television, radio, etc.), as well as satellite broadcast spectra 36, and cable connections 38 (including telephony and multi-purpose cabling). The bidirectional data exchange media may include wired connections 40, wireless connections 42, cellular connections 44, and conventional Internet connections 46. It should be appreciated that certain of the receivers may have various combinations of these, and in many instances, may have facilities for receiving content by two or more unidirectional channels and for exchanging data bidirectionally by two or more bidirectional channels.

Further, the network referred to generally by reference numeral 24 may include separate networks 48 and 50, as in the case of an Internet connection through a Internet service provider, and a separate cellular connection through a cellular service provider. Of course, the networks may include wired or wireless networks at the receiver location (e.g., a wired or wireless LAN), wide area networks, virtual private networks, and so forth.

Similarly, where broadcast media other than the traditional television "airwave" delivery system is used, the broadcaster may include or control devices for such media. For example, as represented diagrammatically in FIG. 2, the broadcaster may unidirectionally transmit the content via a satellite 52 or cable network, a cellular transmission system 54, and so forth. When the broadcaster itself does not own or control such devices, it may work in conjunction with entities that do in order to adjust or adapt the system or component operation as set forth herein. In such cases, for the present purpose, the satellite signal provider, the cable signal provider, the cellular provider, and so forth should be understood as part of the general reference to "broadcaster".

It should be particularly noted that the "broadcast" of content, in the present context, refers to the dissemination of content to a potential audience made up of many receivers without regard to selection of any particular content stream by any particular receiver. That is, the broadcast is not, itself, individualized. Individual receivers receive the same content that is broadcast to all. This will, in certain network paradigms, be performed over completely separate media, such as wirelessly over a portion of the electromagnetic spectrum, as in conventional television. However, it may also be performed over media that are themselves capable of bidirectional communication, but that are not used in this manner for the broadcast of the content. For example, even if some satellite, cable, wired telephony, cellular telephony, or Internet-based media may be used for two-way communication, the "broadcast" of a content stream, as referred to herein is performed over such media without regard to how, when or even whether any particular receiver is "tuned into" or has selected the content stream as opposed to other streams or nothing at all. By way of further example, in many Internet-based content delivery systems, transmit content only when specifically requested or selected to a specific recipient. Such so-called "on-demand", recipient-specific delivery is not considered "broadcast" in the present context. Similarly, however, the term "stream" should not be read as limiting insomuch as it may refer to continuous, multiplexed, discretized, or packetized transmissions, or any other approach to the dissemination of the content.

It should also be noted that the present techniques are intended to apply to various types of "content" and "media content". Where reference is made in the present discussion to "multimedia content" or to "content" or to "media content", this should be broadly construed. That is, while conventional television programming typically involves the delivery of signals that are translated into images (particularly moving images) and sound. The "content" or "media content" broadcast and analyzed by the present invention certainly includes such programming. However, "content" and "media content" may also include transmissions in accordance with other technologies, as described herein, as well as images alone (still and moving), sound alone, and so forth. Moreover, the "content" and "media content" may include renderings produced by so-called "late binding", and similar techniques, in which some or all of the data needed for the rendering is transmitted or stored separately from other data, and the data elements are combined at or near the point of rendering (e.g., in the receiver or a component coupled to the receiver).

Figure 3:
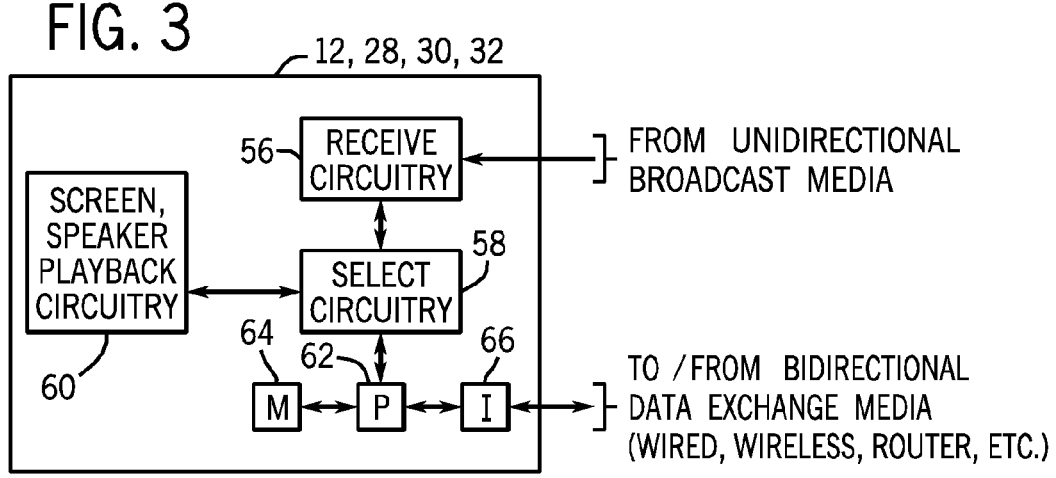
FIG. 3 is a diagrammatical illustration of certain of the functional components of an exemplary receiver for use in the present techniques.

FIG. 3 is a diagrammatical representation of an exemplary receiver that might be used in conjunction with the present techniques. In this embodiment, the receiver, which may correspond to any one of the receivers 12, 28, 30 and 32 discussed above, will include signal reception circuitry 56 and program selection circuitry 58. In the case of conventional television broadcast media, the reception circuitry will include an antenna and decoding circuitry for transforming the received signals into a viewable image and/or audible sound. The selection circuitry 58 may include an on-set dial or buttons, or a remote control that allows the user to select the one program (content stream) for viewing and/or listening as opposed to others received or receivable by the signal reception circuitry 56. Playback circuitry 60 is coupled to the signal reception circuitry and to the selection circuitry to allow the signals to be transformed for viewing and listening. It should be noted that the present techniques may be used for image programming only, or audible programming only, but is particularly well suited to multimedia programming. The circuitry used for reception of the signals, selection of the programming or content, and for playback may be conventional in nature. Moreover, these may include processing and memory circuitry (not separately shown) for recording and later playback of content.

Processing circuitry 62 allows for access and at least some processing of data available within the receiver, while program code executed by the processing circuitry 62 may be stored on the processing circuitry itself (if available) or on separate memory circuitry 64. The data accessed and processed may include any and all of the data discussed above with reference to FIG. 1, and will preferably include the current program selection made by the viewer. Interface circuitry 66 is coupled to the processing circuitry and allows for bidirectional data exchange as discussed above.

Figure 4:
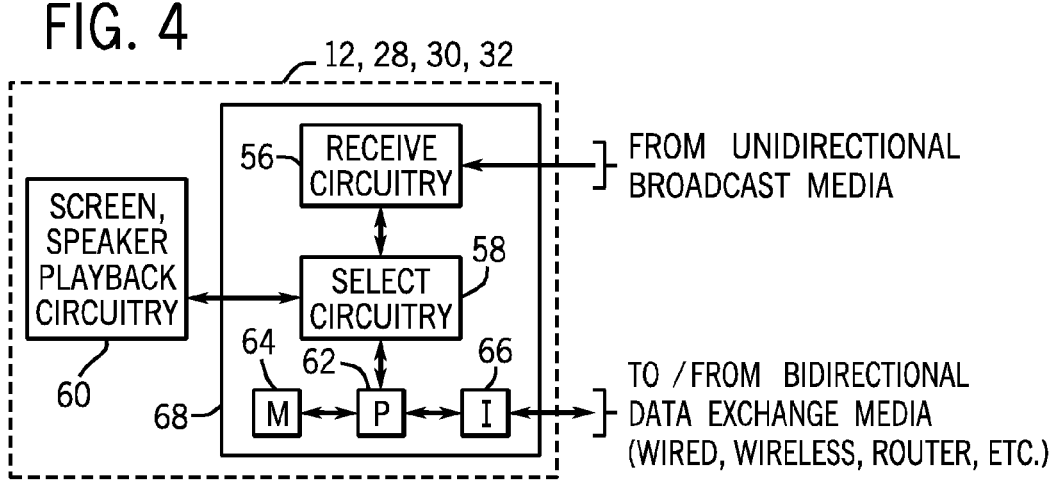
FIG. 4 is a diagrammatical illustration of an alternative receiver implementation.

FIG. 4 represents one of many possible alternatives for the configuration of the receiver. In this embodiment, the playback circuitry 60 is separate from the other functional components, such may be provided in a "set-top box" 68, or the like. Several types of such devices presently exist and others will likely come into being during the useful life of the present techniques. Such devices provide for reception of the broadcast signals (by their own circuitry 56), selection of program content (by circuitry 58), and processing, storing and interfacing functions (by their own circuitry 62, 64 and 66). In some cases, these functional circuits may be complementary to those provided in the playback circuitry itself. In other cases, the playback circuitry may comprise a simple monitor, speaker, or the like capable only of signal conversion and content rendering.

Figure 5:
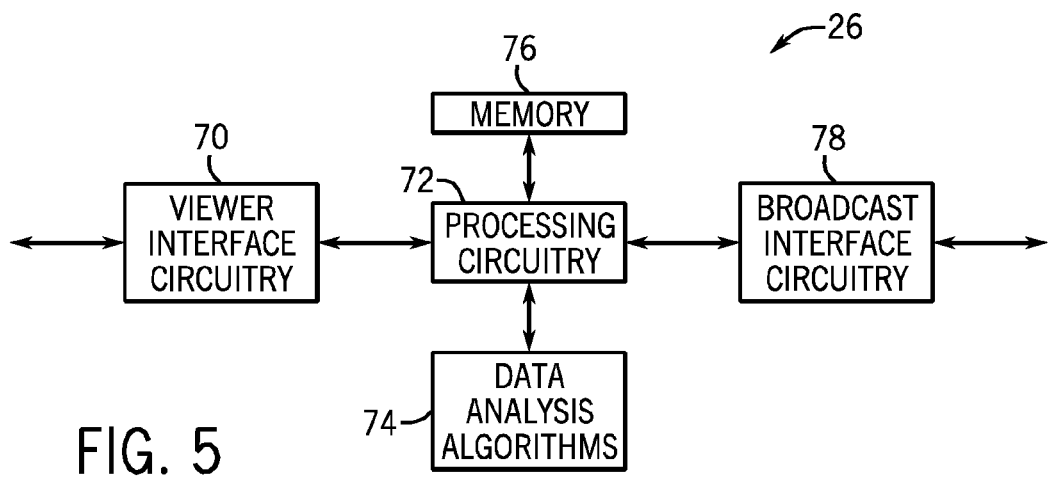
FIG. 5 is a diagrammatical illustration of certain functional components of an exemplary receiver data analysis system.

FIG. 5 illustrates certain functional components of a presently contemplated receiver data analysis system 26. As discussed above, the system will receive signals from multiple receivers (preferably from entire populations or target audiences). Viewer interface circuitry 70 is provided for this purpose. Such circuitry may include conventional servers and interfaces for sending queries, handshakes, data requests and so forth to the receivers, and for receiving encoded data (in response or upon receiver initiation). Such bidirectional transmissions may be made in accordance with any suitable protocol, such as Internet protocol (IP), transmission control protocol (TCP), hypertext transfer protocol (HTTP), file transfer protocol (FTP), and so forth. Processing circuitry 72, which will typically include one or more programmed computers or servers, received and analyzed the data. Algorithms for such analysis will typically be embodied in program code, as indicated by reference numeral 74. This code may be stored in the processing circuitry memory (if available), or may be separately stored in system memory 76. The results of such analysis will also be stored for retrieval, archival purposes, and so forth, although in certain embodiments it will also serve for real time or near real time adjustments in operation of the receiver, and the transmission of data to the receiver, such as for product or service offerings, links, informational content relevant to currently-selected content, and so forth. Finally, the analysis system will be provided with broadcast interface circuitry 78 designed to allow the analysis results (and where desired the raw or processed data) to be provided to the broadcaster, where desired. It should be noted, however, that in certain embodiments, the analysis system 26 may be part of the broadcaster itself. Moreover, the broadcaster may have or draw from more than one such analysis system 26, such as in different geographical regions. Further, where desired, the analysis may be performed by an entirely different entity, such as an Internet, cellular, connectivity or another service provider, and provided to the broadcaster for the purposes described herein.

Figure 6:
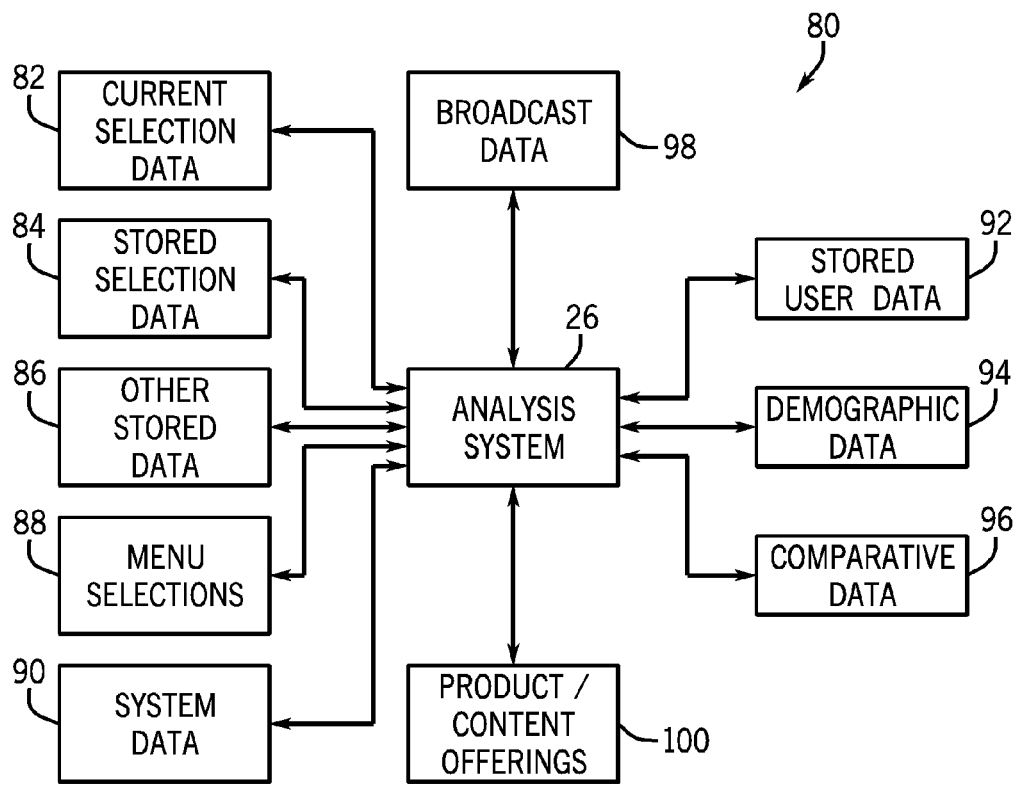
FIG. 6 is a diagrammatical illustration of certain types of data that may be received or accessed by an analysis system for determination of preferences of a user or receiver in terms of broadcast content.

FIG. 6 illustrates certain of the types of data that may be received or accessed by the analysis system 26 in accordance with presently contemplated embodiments. As noted above, certain of this information will be received or accessed directly from a particular receiver. Other information may be obtained from other sources, both non-specific to the particular receiver and specific to either the receiver or a user associated with the receiver. Such information may also be associated with the content. Moreover, other information may include data available from web sites, social networking sites, personal sites for the user of the receiver, and so forth (e.g., for suggestion of programmed content based upon likes and dislikes gleaned from such sources).

In the data transfer arrangement of FIG. 6, designated generally by reference numeral 80, the analysis system 26 may receive current selection data 82. This data may include the selection of a particular "station" on a conventional television that receives the broadcast content over the electromagnetic spectrum, via a satellite transmission or via cable. The current selection will indicate which of numerous available content streams the receiver is currently receiving. For other types of receivers, such as computers and cellular telephones or similar devices, the current selection data may also include those streams which the device is currently receiving by virtue of a user or system selection. As noted above, for this type of device the selection does not refer to specific individualized transmissions upon request by the user (e.g., so called "on demand" content, or specific website downloads accessed by the user and transmitted by a server in reply to an individual user request).

The information may also include stored selected data as indicated by reference numeral 84, as well as any other stored data as indicated generally by reference numeral 86. The stored selection data may be available on the receiver itself or on a device coupled to the receiver, such as a set-top box, computer, and so forth. The stored selection data may include references to particular "stations" or to individual broadcasts that were accessed by the receiver. In certain circumstances, the data may only be of interest if the broadcast was accessed for more than a particular length of time, and such filtering may be performed on the receiver side, or by the analysis system 26. Other stored data may include any user or system-specific settings. Certain settings and selections will be of particular interest, such as menu selections as indicated by reference numeral 88. Most are currently available on televisions and television interfaces allow for refinement of station menus, such as by selecting or de-selecting particular stations, groups of stations, categories of stations or broadcasts, and so forth. These may be of particular interest to the system insomuch as they can be customized based upon the user or receiver selection preferences and history. Finally, system data 90 may be collected. Such system data may include, for example, user or receiver identifying data, system serial numbers or codes, and particularly that information that will permit analysis of where the system is situated, how the system is used, and any known or discernable likes, dislikes and generalize preferences of the system users.

It should be noted that the data received by the analysis system from the particular receivers may be provided by the receivers via the bidirectional data communication media (data "pushed" by the receiver), or may be accessed by the analysis system from the receivers (data "pulled" from the receiver). Thus, "pull" and "push" technologies may be employed. As noted above, however, the present techniques may be offered as a special feature, with the user or system being afforded an opportunity to opt in or opt out, or even to at least temporarily preclude the access of data. Moreover, certain data may be designated by the user as "off limits" such that personalized preferences, certain viewing patterns, certain types or classes of information will not be collected or received out of respect for the privacy of the user.

The analysis system 26 may collect information from other sources as well. These may be local to the analysis system or may be completely separate, and may even be offered by other service providers. For example, as illustrated in FIG. 6, stored user data may be accessed as indicated by reference numeral 92. Such user data may be part of a provider's billing, payment, contract, business or other records for the particular user. A user may, for example, complete a profile upon initiation of certain services, or may add to or change the profile from time to time. The stored data may also include records of past purchases of particular content, transmissions of content, user's right to particular content and so forth. Similarly, as indicated at reference numeral 94, certain demographic data may be accessed. Such demographic data may include, for example, reference to preferences by other or similar receivers within a particular area or slice of a possible audience. This information may be accessed and analyzed based upon the data already retrieved from the receiver. Finally, certain comparative data may be accessed as indicated by reference numeral 96. That is, similar to the demographic data analysis, data may be collected that compares certain preferences of the particular receiver or user to other preferences, likes or dislikes of other similar receivers or users.

The analysis system will also typically have or access data regarding the broadcast as indicated by reference numeral 98. That is, the analysis of the information from the receiver, particularly content stream selections, will be made much more meaningful if the nature of the particular broadcasts are known. By way of example, the selections, in combination with knowledge of the broadcast data, may indicate that a particular recipient tends to watch certain content during evening hours, other content during morning hours, certain content during weekend periods, certain content not at all, with heavy preferences for other content. This information may be stored at one or more broadcast providers, but may be conveniently placed in a common database such that various characterizing parameters of a wide range of content streams (such as classifications, hours of broadcast, target audience data, etc.) may be readily accessible. It should be noted that, as described below, some of the collected information and results of analysis may be stored for later reference. Such storage may include sharing of certain information with other providers, such as to interfaces for users, advertisers and the like, in a manner similar to audience measurement and tracking tools currently available for analysis of visits to web sites (e.g., to measure website "hits").

In the embodiment illustrated in FIG. 6, the analysis system also accesses product and/or content offering data, as illustrated at reference numeral 100. This data may include a very wide range of information that may be of interest to particular receivers or users based upon the analysis performed. For example, the product offerings may include offerings of actual physical products that can be viewed, purchased, or otherwise brought to the attention of the user. Other products may include services, such as enhanced viewing services, pay-per-view content offerings, and so forth. However, in presently contemplated embodiments the offerings may simply include information, links, and so forth that may be of interest to the user to enhance the entertainment experience. For example, on conventional television receivers, banners, insets, and the like may be provided to add information, details, and so forth during a broadcast. Similarly, on other devices, such as computer stations, clickable links and similar devices may be sent to the particular receiver to permit interaction with one or more websites to access additional information during a broadcast. In all of these types of devices, moreover, particularized advertisement may be sent to the receiver based upon collection and analysis of the data. In presently contemplated embodiments, the user may select or deselect such offerings, based upon relative interest in the types of offerings and information being provided. Thus, the user may be provided with full control of the experience.

Figure 7:
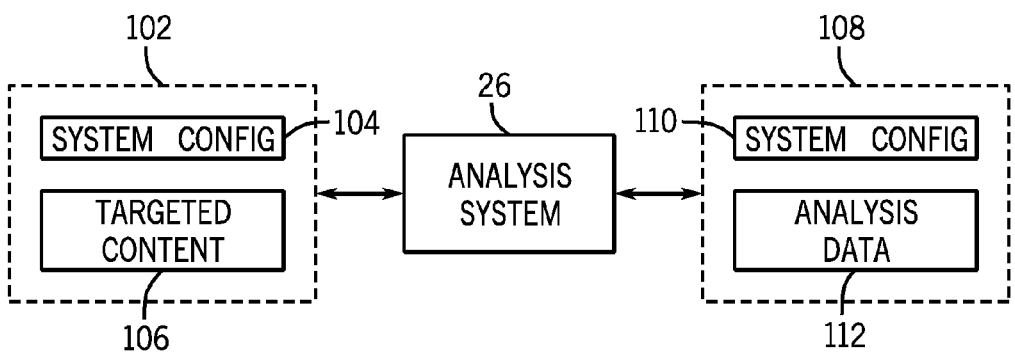
FIG. 7 is a diagrammatical illustration of exemplary output operations that may be performed in accordance with the present techniques, to provide customized control and/or offerings to particular receivers.

FIG. 7 illustrates certain of the types of transmissions that may be outgoing from the analysis system 26. A reference numeral 102 refers to a certain data and transmissions that may be sent back to particular receivers. In presently contemplated embodiments, this information may include certain system configuration data 104, or targeted content 106. In a particular embodiment, system configuration data 104 may alter or enhance system performance. For example, based upon collected information it may be determined that the user never or very rarely selects certain content streams, stations, and so forth. Accordingly, the system may provide for configuring or reconfiguring a selection menu to show the more frequently selected stations and not show or show in a different priority those stations that are rarely selected. Moreover, such system configuration information may be time-dependent or may reflect changes in current or upcoming programming. For example, as noted above, if it is determined that a user or particular receiver has particular viewing patterns in a evening hours or weekends, the system configuration, particularly the user-accessible menu, may be altered during these periods as opposed to others. As always, provision may be made for user override of such features. Similar changes may be made, for example, to viewing preferences, such as aspect ratio, informational insets, and so forth based upon determination of user preferences. The targeted content 106 may include, as noted above, any particular content information, product offerings, service offerings, and so forth. In both cases, the system configuration data and the targeted content data may be "pushed" directly to the particular receiver without user participation, or may be "pulled" by the receiver from the analysis system or any other source, with or without user intervention. To enhance the experience, the system may include user acceptance requirements prior to the transmission of this data, or prior to changes in system configurations.

As also illustrated in FIG. 7, certain data may be transmitted from the analysis system to other resources, particularly to storage devices within the analysis system or remote from it. Such data, designated generally by reference 108, may include system configuration data 110. The system configuration data may be similar to that, or even identical to that transmitted to the particular receiver. It may include system settings, menu preferences, aspect ratio preferences, and so forth. As noted below, this may permit other receivers to receive the configuration information and perform in many ways similarly to the particular receiver customarily used by the user, such as during travel, in hotels or other households or venues, and so forth. In a similar manner, a new receiver may be made to perform in many ways as did a previous receiver based upon user preferences transferred in the same way, such that a new system "inherits" the preferential attributes of a former one. Analysis data 112 may also be stored. Such analysis data may memorialize historical analysis of the broadcast content stream reception and preferences of individual receivers, or of collections of receivers. The analysis data may be accessed subsequently, as summarized with reference to FIG. 6, to detect changes in viewing patterns, confirm patterns, and so forth.

Figure 8:
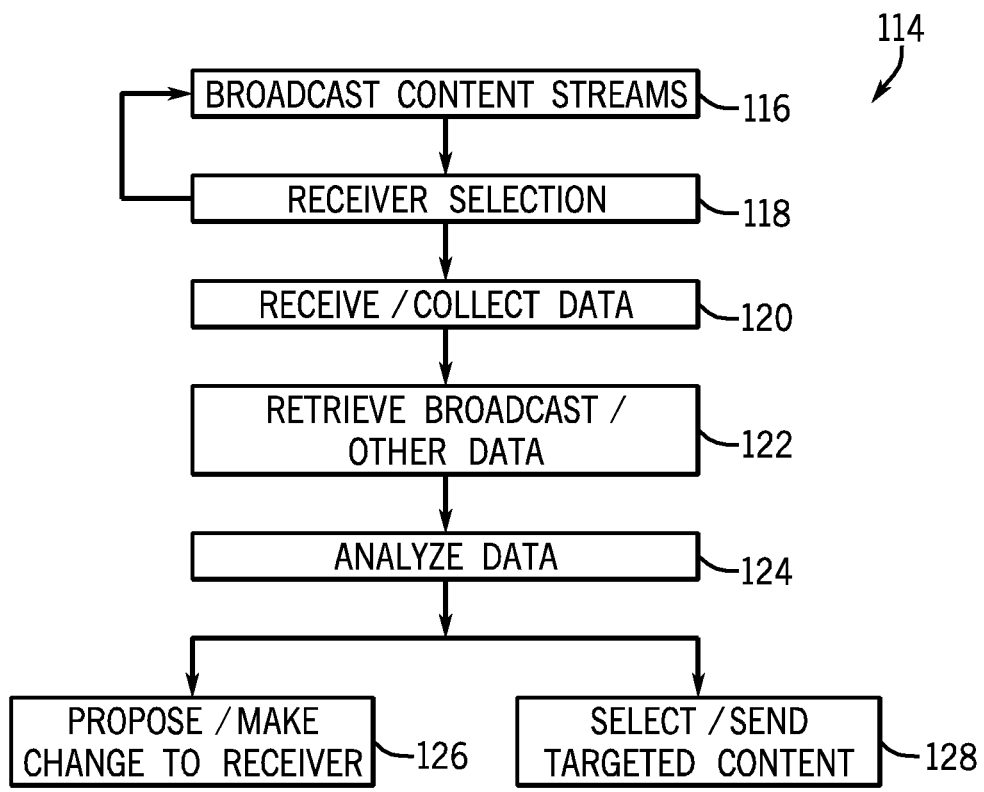
FIG. 8 is a flow chart illustrating exemplary steps that may be performed in reception and analysis of receiver data, and for provision of customized control and/or offerings to particular receivers.

FIG. 8 is a flow chart illustrating certain of the steps that may be performed by the systems described above. The processing, designated generally by reference numeral 114, may be performed by the analysis system discussed above, or by multiple interrelated systems, which may be part of the same entity or different entities operating in cooperation. The steps will typically be performed by various computer systems, processors, servers, and so forth, in conjunction with suitable memory local to these devices or remote from them. In general, the flow begins with broadcast of content streams as indicated by reference numeral 116. As noted above, this broadcast may be performed over traditional television spectra, via satellite, via cable services, via cellular services, via Internet-based services, and so forth. The broadcast is performed without regard to which content streams individual receivers have selected, or whether any particular receivers have selected a particular content stream at all. Therefore, the broadcast is not individualized. Similarly, the content streams may be disseminated by a single broadcaster or by many broadcasters. At step 118 a particular receiver makes a selection of one of the broadcast content streams. The system will typically monitor operation of many such receivers, but for the purposes of customizing control and/or offerings to a particular receiver, focus here is on the selection by the particular receiver. As indicated by the return arrow to step 116, this process is typically continuous, with the receiver maintaining a particular selection or making difference selections overtime.

At step 120, data is received or collected from the particular receiver. This may be performed as noted above by "push" or "pull" techniques, with the receiver being afforded an opportunity to opt in or opt out, depending upon the data collection paradigm. At step 122, then, data may be collected from broadcasters, content and product offering providers, and other resources as summarized generally above with regard to FIG. 6. This data is then assembled and analyzed as indicated at step 124. The analysis step may include, in practice, many algorithms for determining patterns in selection of content streams, correlating the selections to the nature or character of the particular content streams, correlating the information to past preferences of the same receiver, or to those of other receivers, particularly receivers that are comparable in preferences. The analysis may, however, be much simpler, with simple determination of which station a user has currently selected. Those skilled in the art may device a wide range in various combinations of such analysis for particular marketing informational, and convenience purposes.

Steps 126 and 128 represent actions that may be taken by the system in response to the analysis. As indicated at step 126, for example, changes may be made or proposed to receiver configurations. As noted above, these may as simple as changing selections or priorities on a menu listing of available content streams or stations. Other more elaborate changes may be made based upon time or viewing, aspect ratios or other hardware or software-specific system capabilities, and so forth. As also noted above, such changes may be opted into or out of by the user, and may be different for different periods, or based upon whether and when particular content streams will be broadcast.

In step 128 various targeted content may be selected and sent to the receiver. Such content may include, for example, advertising content, product or service offerings, informational content, and so forth.

It should be noted that the process summarized in FIG. 8 differ substantially from heretofore known processes. For example, unlike conventional broadcast paradigms, the system allows for customization of control parameters, system settings, and configurations of particular systems based upon analysis of receiver information for broadcast content, as opposed to user-selected content as in the case of Internet-based offerings. Similarly, while informational content has been currently available for specific content streams, stations, programs and the like over broadcast media, these have typically been broadcast with the content itself, and not particularized to receiver preferences.

Figure 9:
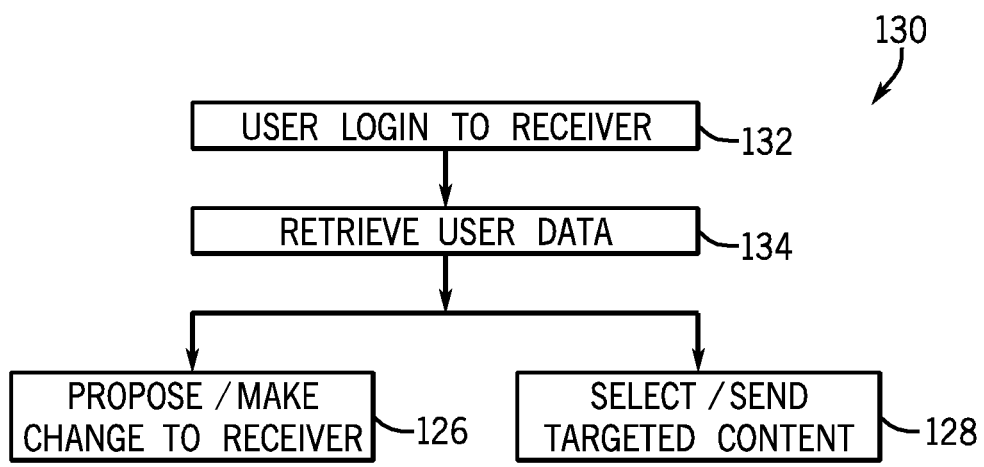
FIG. 9 if a flow chart illustrating exemplary steps that may be performed to permit another receiver to emulate, at least in some respects, those of a particular receiver.

FIG. 9 represents a further operation that may be performed by the system based upon stored preferences and system configuration data. The system adaptation process, generally designated by reference numeral 130, begins at step 132 with a user logging into a receiver. In a presently contemplated embodiment, for example, the user may be at a hotel or other setting where the receiver being utilized is not the receiver with which the user commonly interacts. The receiver may be for example, at another household, or any other setting. The login may include accessing a particular site or service and inputting user identifying data and authentication data, such as a user name and password. The login data will be sent to the analysis system, or system operating in conjunction with the analysis system to access user data as indicated at reference numeral 134 based upon the login. This data may include, for example, the system configuration data 110 summarized above in FIG. 7. This data may, where possible, be used to make changes to the particular receiver now being employed by the user, as indicated by reference numeral 126. That is, in a hotel, or other setting the user may be able to interact, such as by remote control, with a station or content menu in the same way that the user would interact with the particular receiver for which the configuration was developed or accessed. Similarly, viewing preferences in terms of color settings, image control and the like may be transferred to the new receiver or any control systems associated with the receiver to have the new receiver emulate, at least in some respects, the particular receiver usually accessed by user. As noted above, this may also permit configuration or reconfiguration of a new receiver or system to behave, at least in preferred ways, like a former system to which the user is accustomed. Moreover, in another presently contemplated embodiment, such data for configuring or reconfiguring a system may be stored on a transportable means, such as a flash memory dongle, memory card, or some other transportable memory that may be coupled to a different receiver to transfer at least one fo the operational control parameters. Similarly, as indicated by reference numeral 128, the system may select and send targeted content to the new receiver in much the same way as that described above with reference to FIG. 8.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for controlling distribution of media content, via an analysis system, comprising:
   determining whether a setting of a particular receiver is set to opt-in to receive system configuration alterations based upon one or more preferences, transmit data useful in determining the one or more preferences, or both;
   when the setting of the particular receiver is set to opt-in:
      providing data from a particular receiver of a plurality of receivers to the analysis system, the data being indicative of at least one of:
         at least one selection by a user of the particular receiver of at least one of a plurality of content streams broadcast to the plurality of receivers without regard to selection of any particular content stream by any particular receiver
         a state of the particular receiver, a user of the particular receiver, or both;
         historical program selections of the particular receiver, the user of the particular receiver, or both;
         program selection listing preferences of the particular receiver, the user of the particular receiver, or both;

settings for current or future recording of program selections of the particular receiver, the user of the particular receiver, or both; and special orders of present program offerings, future program offerings, or both, placed by the particular receiver, the user of the particular receiver, or both, wherein the plurality of content streams are broadcast over a different data exchange medium than a data exchange medium over which the data is received, the received data including data identifying a particular broadcast content stream currently selected on the particular receiver; and wherein the analysis system analyzes the received data to identify the one or more preferences from the particular receiver; and receiving data at the particular receiver based on the identified preference, the data comprising system configuration data configured to alter a system configuration of the particular receiver based upon the one or more preferences when the setting of the particular receiver is set to opt-in.

2. An analysis system, comprising:

a processor configured to:

receive data from a first particular receiver of a plurality of receivers, the data being indicative of at least one of:

at least one selection by a user of the first particular receiver of at least one of a plurality of content streams broadcast to the plurality of receivers;

a state of the first particular receiver, a user of the first particular receiver, or both;

historical program selections of the first particular receiver, the user of the first particular receiver, or both;

program selection listing preferences of the first particular receiver, the user of the first particular receiver, or both;

settings for current or future recording of program selections of the first particular receiver, the user of the first particular receiver, or both; and special orders of present program offerings, future program offerings, or both, placed by the first particular receiver, the user of the first particular receiver, or both;

analyze the received data to identify a preference from the first particular receiver; and transmit system configuration data configured to alter operation of a second particular receiver to the second particular receiver based upon the identified preference from the first particular receiver, such that the operation of the second particular receiver is altered to behave similarly to an operation of the first particular receiver.

* * * * *